Jan. 13, 1925.

J. L. BREEZE

LUMBER TRIM SAW

Filed July 16, 1923

INVENTOR
JOHN L. BREEZE
BY
Richard J. Cook
ATTORNEY

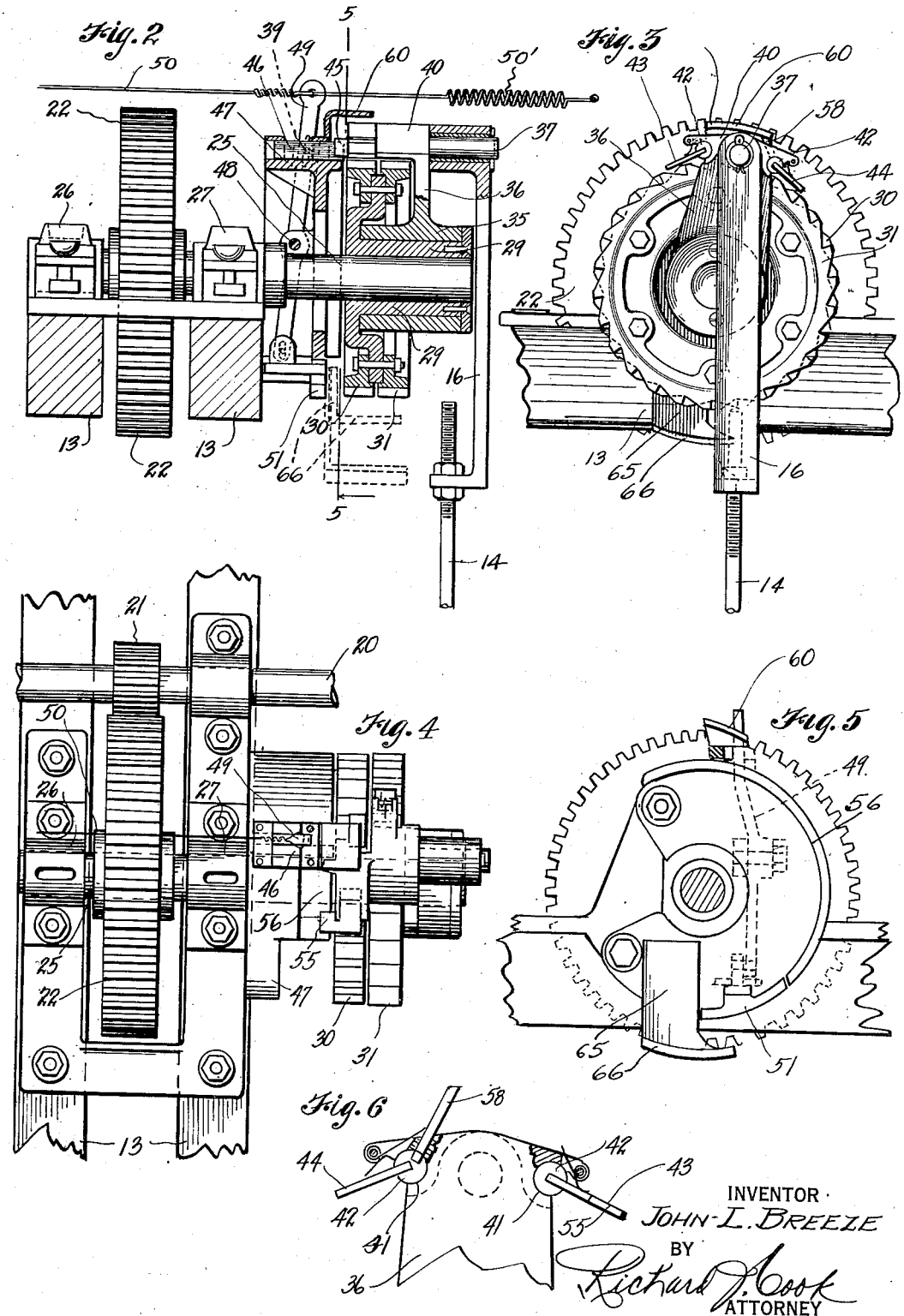

Patented Jan. 13, 1925.

1,522,940

UNITED STATES PATENT OFFICE.

JOHN L. BREEZE, OF SEATTLE, WASHINGTON, ASSIGNOR OF ONE-HALF TO SUMNER K. PRESCOTT CO., OF SEATTLE, WASHINGTON.

LUMBER-TRIM SAW.

Application filed July 16, 1923. Serial No. 651,731.

*To all whom it may concern:*

Be it known that I, JOHN L. BREEZE, a citizen of the United States, and a resident of Seattle, King County, Washington, have invented certain new and useful Improvements in Lumber-Trim Saws, of which the following is a specification.

This invention relates to improvements in lumber trimmers of the character wherein lumber is trimmed to uniform, standard lengths by the employment of a plurality of saws mounted in independently movable frames and wherein a conveyer is employed to advance the lumber to be trimmed to the saw.

The principal object of this invention is to provide means whereby any selected saw may be automatically lowered from raised position into trimming position and means whereby it may be moved again after trimming has been done into raised position with means whereby it will be automatically stopped in this raised position until manually released.

Other objects of the invention reside in the various details of construction and combination of parts embodied in the invention and in their mode of operation as will be pointed out in the following description.

In accomplishing these and other objects of the invention, I have provided the details of construction, the preferred forms of which are illustrated in the accompanying drawings, wherein—

Figure 2 is an elevation, partly in section, illustrating details of construction of the saw lifting and lowering mechanism.

Figure 3 is an end view of the same.

Figure 4 is a plan view of the mechanism, as illustrated at Figure 2.

Figure 5 is a transverse section taken on the line 5—5 in Figure 2.

Figure 6 is a detail view of the lifting and lowering dogs.

Figure 1:
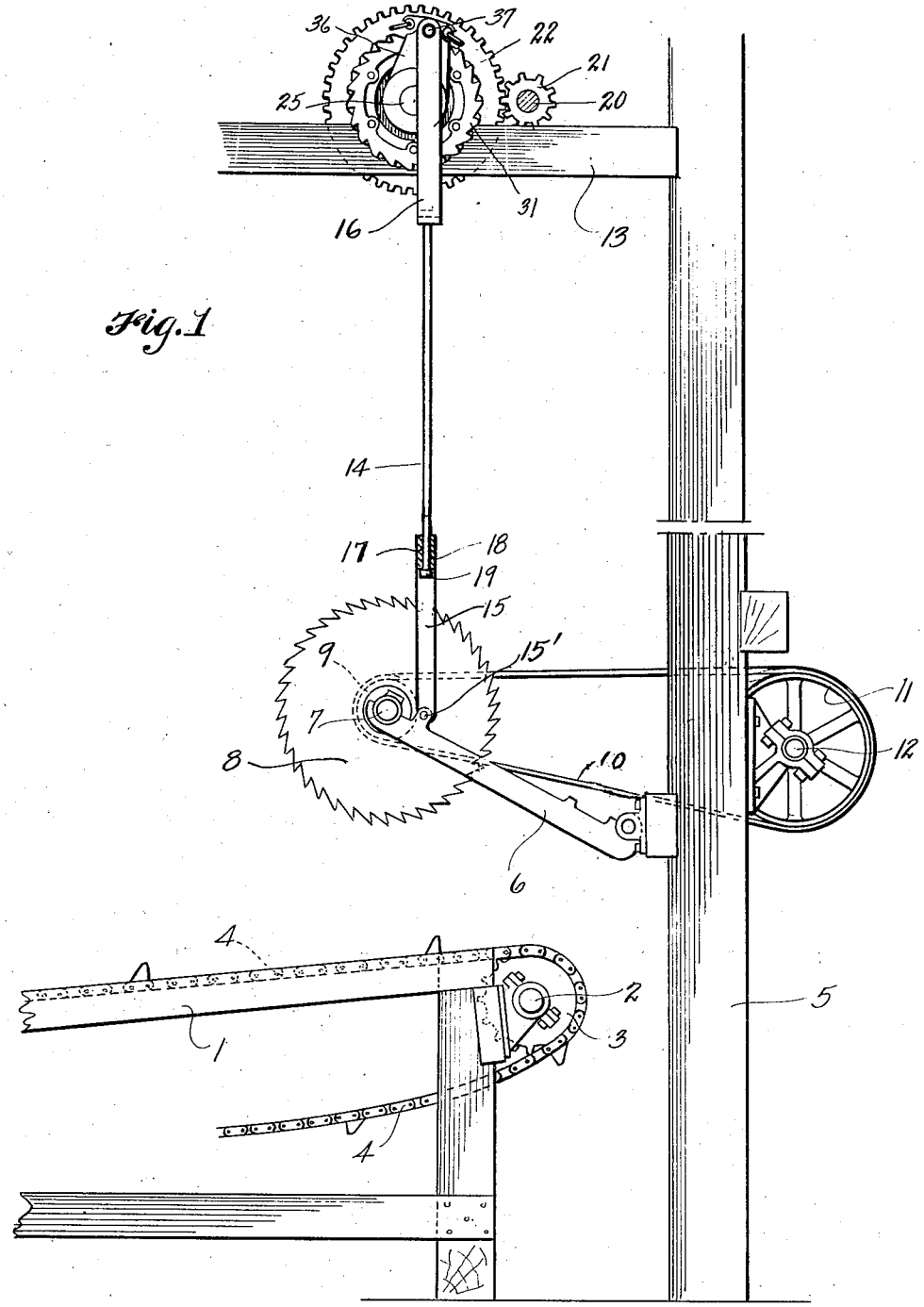
Figure 1 is an end view of a lumber trimmer embodying mechanism constructed in accordance with the present invention.

Referring more in detail to the drawings—

1 designates the frame work of a trimmer table having an upwardly inclined top and having a revolubly driven shaft 2 mounted at one side thereof equipped with sprocket wheels 3 about which conveyer chains 4 operate to advance lumber to the trimming saw. Adjacent the table is a saw supporting frame comprising the uprights 5 to which a plurality of saw frames 6 may be pivotally fixed in such manner that their movable ends may be swung vertically. At their outer ends the saw frames are equipped with arbors 7 whereon circular trimming saws 8 are mounted and with pulleys 9 about which belts 10 operate to drive the saws. The belts are extended over pulleys 11 on a driving shaft 12 supported from the uprights 5.

In the present trimmer the different saw frames are raised or lowered to bring the saw carried thereon from and into position to trim the lumber that is advanced thereto on the trimming table, by means of mechanism that is supported above the line of saws on a suitable frame work comprising the cross beams 13. Each saw is operated independently of the others by a lifting and lowering mechanism which embodies the principal part of the present invention.

Each of the lifting and lowering mechanisms is connected with its respective saw frame by means of a suspending rod 14, the lower end of which is connected with a link 15 that is pivotally attached, as shown in 15' to the outer portion of the saw frame 6, and at its upper end is attached to a link 16 that is pivotally connected with the mechanism. The lower end of the rod 14 is extended slidably through an opening 17 in a laterally turned foot 18 formed at the upper end of the link 14 and has a nut or a head 19 thereon to engage the under side of the foot to provide the lifting connection, but which will permit raising of the saw should it jam in the lumber.

In the trimmer each saw raising and lowering unit is operated from a driven shaft 20 that is supported rotatably above the line of saws in suitable bearings mounted upon the beams 13. Each unit comprises a main driving gear 22 that is fixed on a short shaft 25 rotatably supported in bearings 26 and 27 formed as a part of a frame that is mounted upon the supporting beams 13. This gear 22 is continuously driven by means of a gear 21 on the shaft 20. Mounted on an extended end of the shaft 25 so as to turn therewith, is a hub 29 on which two ratchet wheels 30 and 31 are mounted; the teeth of the two ratchet wheels being faced in opposite direction. Fitting rotatably over the hub 29 at the outer side of the wheel 31, is the mounting bearing 35 of a radially extending arm 36 provided at its outer end with a stud 37 whereon the upper end of the link 16 is pivotally secured. This construction provides that upon rotation of the arm 36, due to its connection through rod 14, there will be effected a raising and lowering movement of the saw frame 6 that will bring its saw into and from trimming relation with lumber that is advanced by the conveyer.

At the outer end of the arm 36 is a head 40 having sockets 41 formed in its opposite faces wherein the mounting heads 42 of oppositely extending dogs 43 and 44 are pivotally contained so that the said dogs may swing from and into abutting engagement respectively with the teeth of the ratchet wheels 30 and 31. A stop lug 45 is also provided on the inner side of the head 40 that is adapted to engage with a normally extended stop bolt 46 that is mounted slidably in a bracket 47 that is fixed to a beam 13 adjacent the inner face of the wheel 30. The bolt 46, when extended, will engage with the lug 45 and thereby serves as a means of retaining the arm 36 in substantially an upright position, but inclined slightly beyond the dead center position, as is illustrated in Figure 3, so that when the stop bolt is withdrawn the weight of the suspended saw will cause the arm to swing inwardly. In order that the saw will not be permitted to drop suddenly, I have provided that the dog 44 will engage with the teeth of ratchet 30 upon the initial movement of the arm so that the downward movement of the saw will be limited by the rate of rotation of the ratchet wheel, which has a relatively slow movement.

The means provided for actuating the bolt 46 into and from holding position comprises a vertically extending lever 49 that is pivotally fixed by means of a bolt 48 with the bracket 47. The lever is provided with a vertical slot wherein a pin 39 that is fixed in the bolt 46 extends. An actuating cable 50 is attached to the upper end of the lever whereby it may be moved so as to shift the stop bolt from holding contact with the lug 45. When the cable 50 is released, a coiled spring 50' draws the lever back to normal position. At its lower end the lever 49 is pivotally fixed by pin and slot connection with an arcuate shoe 51 that is slidably supported in the lower portion of the bracket 47 and which will be moved toward and from ratchet wheel 30 as the stop bolt 46 is moved outwardly and inwardly.

Means is provided whereby both the dogs 43 and 44 will be lifted from engagement with their ratchet wheels when the saw is in raising position so that the saw will remain out of trimming position until it is manually released. The dog 43 is lifted from engagement with its ratchet 30 as the arm 36 moves into or slightly past vertical position by means of a finger 55 that is extended laterally therefrom into position to ride upon an arcuate flange 56 that is formed as a part of the bracket 47, or which may be attached thereto and which extends concentrically about the shaft 25 in the direction of rotation and terminates in registration with the shoe 51, as is shown in Figure 5. This flange and the shoe 51 serves the purpose of retaining the ratchet dog 43 disengaged during lowering of the saw and until such time that it is required that the saw be lifted. The other dog 44 is held disengaged from the ratchet 31 while the saw is in raised position by means of a finger 58 that is fixed to the dog mounting head 42 and which engages with the under side of an arcuate flange 60 that is supported concentrically above the shaft 25.

In order that the dog 44 may be held disengaged from the ratchet when the arm 36 has swung downwardly, I have fixed a bracket 65 to the mounting bracket 47 to extend downwardly and at the lower end of this is an out-turned flange 66 upon which the finger 58 will ride to move the dog away from the ratchet.

Assuming that the parts are so constructed and assembled, and are connected with the saw frame, as described, the operation would be as follows: Starting with the saw in raised position, as shown in Figure 1, if it should be desired to lower the saw for the purpose of trimming off a piece of lumber, the operator would draw on the cable 50 thereby moving the lever 49 to cause bolt 46 to be moved from holding engagement with the stop lug 45 so that the weight of the saw and its frame will cause the arm 36 to swing downwardly. Upon initial movement of the arm 36, the finger 58, which retains the dog 44 disengaged from ratchet wheel 31, is released from the flange 60 and the dog is allowed to drop into engagement with a tooth of the ratchet wheel 31 so that the saw frame is thereby prevented from dropping suddenly and is lowered slowly in accordance with the movement of the ratchet. During the lowering operation, the dog 43 is held disengaged from its ratchet by the finger 55 riding on the arcuate flange 51 and as the saw reaches its lower limit of travel, the finger moves into engagement with the arcuate shoe 51.

The dog 44 is held disengaged from its ratchet by the finger 55 that rides upon the flange 66 of bracket 65.

When it is desired to lift the saw from trimming position, the lever 49 is shifted inwardly at its top thereby withdrawing the shoe 51 from holding relation with the finger 58 of dog 43 and allowing the latter to be moved by its spring into engagement with the ratchet 30, and due to the rotative movement of the latter, the arm 36 will be moved upwardly and finally over the dead center point until the lug 45 is stopped by the bolt 46, thereby retaining the saw in elevated position.

Having thus described my invention, what I claim as new therein and desire to secure by Letters-Patent, is:

1. In a trimmer of the class described, the combination with a swingingly supported saw frame of a rotatably driven member, a rotatably mounted arm connected to raise and lower the saw frame incidental to its rotation, and means operable to effect or disconnect a driving connection between the said arm and rotatably driven member.

2. In a trimmer of the class described, the combination with a swingingly mounted saw frame, of a rotatably driven member, a rotatably mounted arm connected to control the lowering or lifting of the saw frame, means on the arm adapted to engage with the rotatably driven member to rotate the arm to lift the saw frame, a stop mechanism and a release for said means whereby said arm will normally be retained to hold the saw frame in raised position and a manual release for said stop.

3. In a trimmer of the class described, the combination with a swingingly mounted saw frame, of a rotatably driven member, a rotatably mounted arm connected to raise or lower the saw frame incidental to its rotation, latch mechanism on the arm engagable with the rotatably driven member to effect the lifting of the saw frame and for controlling its rate of lowering, means for automatically releasing said latch mechanism at the end of a lifting or lowering movement of the arms, a manually operable stop mechanism for normally retaining the frame in elevated position and movable to effect the engagement of the latch mechanism to cause lifting or control the lowering of the saw frame.

4. In a trimmer of the class described in combination with a swingingly supported saw frame, a lifting and lowering mechanism for said frame comprising a rotatably driven shaft, a pair of ratchet wheels rotatable with the shaft, and a crank arm rotatable about the shaft and connected to raise and lower the saw frame incidental to its rotation, a stop mechanism engagable with the arm for retaining the saw frame normally in lifted position, means for moving the stop to release the arm, a dog on the arm engageable with one of the ratchets to control the lowering of the arm, another dog engageable with the other ratchet to rotate the arm to lift the saw frame, and means for moving the dogs from engagement with said ratchets, at the end of a raising or lowering movement of the frame.

5. In a trimmer of the class described, the combination with a swingingly mounted saw frame, of a lifting and lowering mechanism therefor comprising a rotatably driven shaft, a pair of ratchet wheels rotatable with the shaft and having teeth faced in opposite directions, an arm rotatable about the shaft, and connected to raise and lower the saw frame incidental to its downward and upward rotative movement, a stop lug on said arm, a shiftable stop engagable with said lug to retain the arm in raised position, a pair of dogs pivotally mounted on the arm engageable respectively with said ratchet wheels to control the rate of lowering of the arm and to effect its raising movement, means for releasing the latches from the ratchets at the end of a raising movement, a latch release shoe for normally retaining the lifting dog disengaged when the arm is in lowered position and manually operable means for said stop bolt and for said shoe.

6. In a trimmer of the class described, the combination with a swingingly mounted saw frame of a lifting and lowering mechanism therefor comprising a rotatably driven shaft, a pair of ratchet wheels having teeth faced in opposite directions rotatable with the shaft, an arm rotatable about the shaft having a pin extended from its outer end, a link connected at its lower end with the saw frame and at its opposite end with said pin, a stop lug on the arm, a shiftable stop bolt engageable with the lug to retain the arm in raised position, a pair of ratchet dogs pivotally mounted on the arm engageable respectively with said ratchet wheels to control the rate of lowering of the arm and to effect its raising movement, means for releasing the dogs from the ratchets at the end of a raising movement, a bolt shift lever and a shoe movable with the lever for normally retaining the dogs disengaged from the ratchets when the saw is in lowered position and shiftable with the lever to release the saw lifting dog.

7. In a trimmer of the class described, the combination with a swingingly mounted saw frame, of a lifting and lowering mechanism therefor comprising a rotatably mounted shaft, a driving gear for the shaft, a hub fixed to the shaft, lifting and lowering ratchet wheels fixed to the hub, an arm having a hub portion rotatably mounted on the first named hub, a link connecting the arm with the saw frame to raise and lower the frame by rotation of the arm, a head portion on the arm, a stop lug on said head, a pair of oppositely extending dogs mounted in the head to respectively engage the lifting and lowering ratchets, a stop bolt engagable with the lug to retain the arm normally in raised position, means for normally retaining the dogs disengaged from the ratchets when the arm is in raised position, but which will permit engagement of the lowering dog with its ratchet upon initial downward movement of the arm, a pivotally mounted lever connected with the shifting bolt whereby the latter may be released from the said lug, a shoe connected with the lever for retaining the dogs disengaged from the ratchets when the arm is in lowered position and shiftable by the lever to release the lifting dog for engagement with the lifting ratchet.

8. In a trimmer of the class described, the combination with a swingingly mounted saw frame and a rotatably driven arm with means for controlling its rotatable movement of a connecting means comprising a link with its lower end pivotally connected with the saw frame and having a laterally extending portion at its upper end provided with a vertical opening and a rod having pivotal connection at its upper end with the said arm and having its lower end extending slidably through said vertical opening and having a head at its lower end engagable with the underside of said laterally turned portion of the link whereby the saw frame may be lifted by upward rotative movement of the arm.

Signed at Seattle, King County, Washington.

JOHN L. BREEZE.